Dec. 31, 1935.    T. R. CAMP    2,025,722
FLOW CONTROL APPARATUS
Filed July 20, 1933
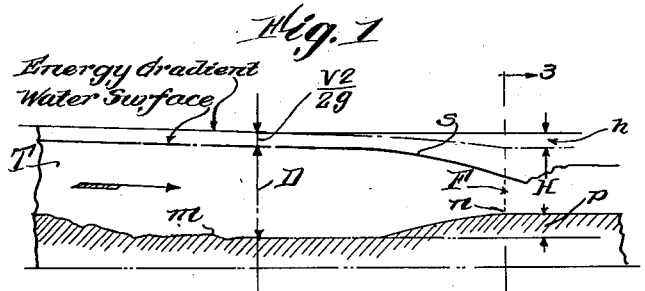
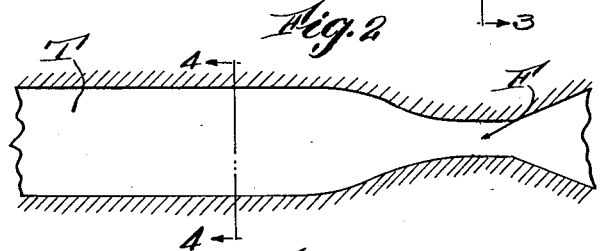
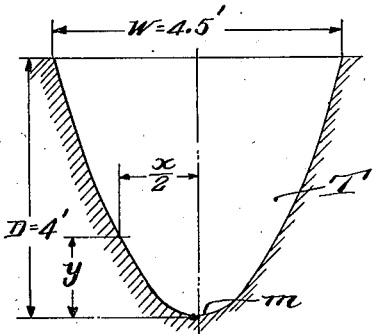
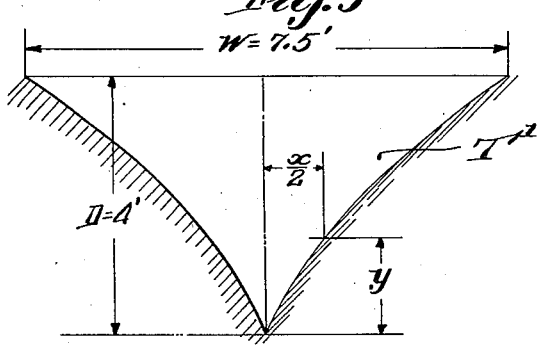
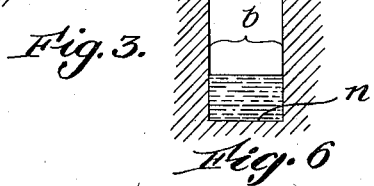
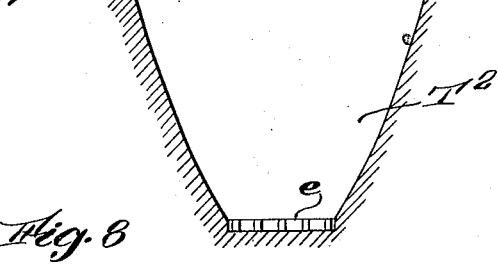
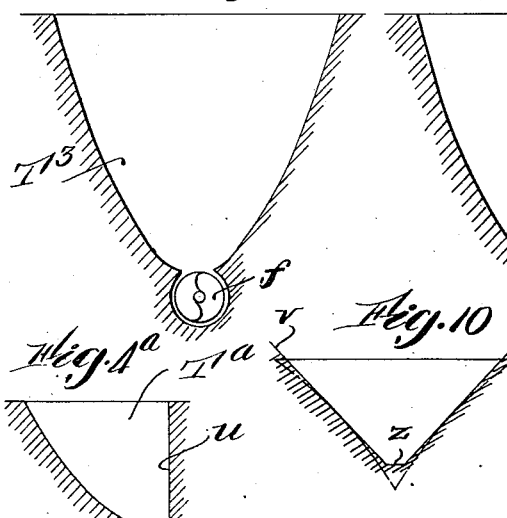
Inventor
Thomas R. Camp
by Roberts, Cushman & Woodbury
his Attorneys

Patented Dec. 31, 1935

2,025,722

UNITED STATES PATENT OFFICE 2,025,722

FLOW CONTROL APPARATUS

Thomas R. Camp, Newton, Mass.

Application July 20, 1933, Serial No. 681,392

16 Claims. (Cl. 61—2)

This invention pertains to fluid flow control apparatus and relates more particularly to means for automatically regulating the velocity of liquid (in passing through a reservoir, tank, or other channel) to a desired or predetermined value for any given rate of discharge. As a special case of this general mode of operation, the apparatus may be designed automatically to maintain a selected predetermined constant velocity through the reservoir or tank for all rates of discharge.

While I contemplate the utility of the invention for many purposes, I apprehend it will be found of especial value in sedimentation systems designed for the separation of relatively heavy settling solids from lighter material by differential sedimentation. Such differential sedimentation is employed for a wide variety of purposes in the arts, for example, in the grading of abrasives;— the purification of china clay,—for ore concentration,—in the manufacture of starch, paper stock, etc.;—in the purification of water supplies; and in the treatment of sewage in sewage disposal systems. Thus, in the last-named instance, the sewage is usually passed through a grit settling tank or chamber wherein sand and other heavy particles are allowed to settle out before the sewage is subjected to further treatment by physical, chemical, biological, or other action. The velocity of flow through such a settling tank or chamber must be kept below a certain critical value in order to prevent the grit from passing out with the efflux, but on the other hand the influx to the settling chamber of a sewage treating system varies between wide limits and difficulty is often experienced in so operating such systems as to prevent excess velocity of flow through the grit chamber. While as just noted, my invention may find its widest utility in sedimentation systems, it may, on the other hand, be employed to prevent undesired settling or sedimentation by maintaining a velocity of flow high enough to transport the suspended material.

In accordance with the present invention, I provide apparatus useful in attaining the desired result and wherein, for instance, by the employment of one or more simple control sections, notches, or weirs, I am able to regulate the depth of flow and concomitantly to determine the velocity of the flow through the chamber. This I am able to accomplish through my discovery of the existence of a simple mathematical relationship between the velocity of flow through the chamber, the cross-sectional shape and dimensions of the chamber, and the width of the control sections or weirs.

In the accompanying drawing I have illustrated, by way of example, certain apparatus constructed substantially in accordance with my invention but without attempt at mathematical accuracy of delineation, and with the understanding that while, for best results, the practical apparatus should be constructed in substantially exact accordance with the formulæ herein deduced and explained, many variations therefrom may be made, in deference to practical considerations, such as materials available to be used,— the expense of construction, etc., without departing from the spirit of the invention or substantial sacrifice of its benefits or advantages.

Fig. 1 is a small scale, diagrammatic, longitudinal, vertical section through a channel or tank and a control section (or weir) illustrating general flow conditions;

Fig. 2 is a horizontal section through the channel and control section of Fig. 1;

Fig. 3 is a vertical section, to larger scale, on the line 3—3 of Fig. 1, illustrating a control section or weir which, in the example shown, is substantially rectangular;

Fig. 4 is a vertical section, to larger scale, for example, on the line 4—4 of Fig. 2, illustrating a typical cross section of tank or channel as deduced in accordance with the herein-described method;

Fig. 4ª is a vertical section of a tank or channel also deduced in accordance with the herein-described method, but illustrative of the fact that the channel contour need not be symmetrical;

Fig. 5 is a vertical section illustrating a different channel shape, as found in accordance with the present method for another set of prescribed conditions;

Figs. 6, 7 and 8 are vertical sections showing how sediment scrapers or conveyors may readily be associated with tank or channel sections such as result from the practice of the present method; and Figs. 9 and 10 are diagrams showing, in vertical section, how flat or plane walled channels may be made to approximate theoretical channel sections deduced in accordance with the present invention.

As already referred to, my invention contemplates the employment of one or more control sections, notches, or weirs at some point in the efflux passage which leads from the tank, channel, or chamber in which the velocity is to be controlled, such control section or sections being adapted to determine the depth of fluid in the tank, channel, or chamber, and,—in combination with such control section or sections, the invention contemplates the use of a tank, channel, or chamber whose vertical cross-sectional shape is predetermined in accordance with the formulæ now about to be explained. It is assumed that the fluid under consideration is a substantially incompressible liquid which follows with reasonable accuracy the general laws relating to hydrodynamics.

I will first deduce a general formula applicable to the case in which the velocity through the tank, channel, or chamber is automatically maintained at a desired rate for any given rate of discharge, and later, special formulæ relating to particular cases, for example, the maintenance of a certain predetermined velocity for all rates of discharge.

When herein reference is made to a "reservoir", "channel", "tank", or "chamber" I do not thereby intend to limit myself to any particular shape of superficial area or to infer that such fluid container is necessarily of greater width than the efflux or influx ducts, and I consider that a fluid container such as a channel, tank, or chamber or reservoir of any vertical cross-sectional shape or dimension, so combined with control sections of the type herein defined as to produce automatic regulation of the velocity within the container, with reference to any given rate of discharge, falls within the scope of my invention.

Referring to Fig. 1, I have diagrammatically illustrated general flow conditions in a system comprising a fluid container T of any desired surface shape and size, and having side and bottom walls of any appropriate material or materials, for example, wood, metal, masonry, earth or the like, through which liquid flows on its way to a control section, notch, or weir F having defining elements of any appropriate material or materials, for example, wood, metal, masonry or the like and having a width (or weir length) $b$ (Fig. 3), such control section being at any desired distance from the fluid container proper but being so arranged as to control the depth of flow through the fluid container. The figure illustrates a single control section, but I contemplate the utility in certain cases of dividing the flow from the fluid container among a number of control sections, or of having a number of chambers discharge through a single control section or through several control sections differing in number from the number of fluid containers or tanks. As illustrated, the control section is rectangular, and by reason of its simplicity and because it lends itself more readily to adjustment of its width, I regard such a section as preferable for the purpose, although I contemplate the utility of other forms of control section such as trapezoidal or V-notches. Moreover, when I herein refer to a "rectangular" control section, I do not thereby intend to limit myself to an exact mathematical contour, but to include such substantially rectangular shapes as are effective for the purpose. The control section here shown is one in which the width is substantially the same at all heights, but it is to be understood that this width $b$ may vary with the height and may be adjustable, if desired. It is contemplated that an adjustable width will be advantageous in that it will make it unnecessary to know accurately the discharge coefficient of the control section and also it will provide some means of changing the velocity if desired. As shown in Fig. 1, the bottom $n$ of the control section is above the lowest point $m$ of the bottom of the fluid container, to wit, the tank, channel, or chamber at that selected vertical section of the latter whose shape is to be determined,—the distance between the bottom $n$ of the control section and the lowest point $m$ of the channel section being herein designated by the character $p$, but it is to be understood that the value $p$ may be positive, negative, or zero without affecting the practice of the present method. As illustrated in Fig. 1, there is an appreciable "drop-down" of the water surface $s$ as the water approaches the control section. The velocity of the flow in the chamber is assumed to be great enough in Fig. 1 to give a measurable velocity head $$\frac{V^2}{2g}.$$

For the purpose of this discussion it is to be understood that the control sections or weirs may be of any usual or approved construction, (preferably, as stated, of substantially rectangular contour) such control sections or weirs being of the kind through which the discharge varies approximately as the three-halves power of the energy head above the bottom of the section, (or above the weir crest),—that is, in accordance with the expression (1) $$Q = cbH^{\frac{3}{2}}$$

where $Q$=the rate of discharge through the control sections, $c$=a coefficient, depending upon the type of control section or sections, $b$=the width of the control sections (or length of the weir) and $H$=the energy head at the control sections measured from the bottom (or weir crest).

If the side walls of each control section are made parallel, the width, $b$, is constant for all depths.

If the side walls converge and meet at the bottom, $b$ will vary with H and may be stated in the equation in terms of H, as, for example, with a V-notch where $$b = zH$$

$z$ being a constant, and (1ª) $$Q = czH^{\frac{5}{2}}$$

If the side walls are not parallel and do not meet at the bottom, $b$ will be a function of both H and the bottom width, as, for example, with a trapezoidal cross section where $$b = b_1 + zH$$

$b_1$ being the bottom width, and (1ᵇ) $$Q = c(b_1 + zH)H^{\frac{3}{2}}$$

Since, as has been stated, control sections of substantially rectangular cross section will ordinarily be preferable, the shape of the cross section of the tank will be developed for this special case. In case a control section of non-parallel side walls is desired, it will only be necessary to state the width in terms of the energy head as in equations (1ª) and (1ᵇ) and develop the equations for tank shape in the same manner as will be described for the rectangular control section.

Experiments indicate that the exponential relation between Q and H for weirs and control sections may vary slightly above or below the value $$\frac{3}{2}$$

and it is contemplated that if extreme accuracy is required in any actual design an experimental value of the exponent may be substituted in the following equations for the theoretical value $$\frac{3}{2}$$

in the determination of the shape of the tank cross section.

At any selected vertical cross section 4—4 (Fig. 2) of the fluid container, that is to say, the tank, channel, or chamber (or in fact any passage through which the fluid flows on its way to the control sections) the maximum depth of the fluid may be expressed as follows:—

(2) $$D = H + h + p - \frac{V^2}{2g}$$

where $D$ = the maximum depth at the cross section under consideration,
$V$ = the mean velocity at the same cross section for the discharge rate $Q$,
$\frac{V^2}{2g}$ = the corresponding velocity head,
$p$ = the difference in elevation between the bottom of the tank or channel at said selected vertical cross section, and the bottom of the control section or sections (or weir crest),—and
$h$ = the lost energy head between said selected vertical cross section and the control section or sections.

Under the above assumption, the discharge $Q'$ past the selected vertical cross section of the tank or channel may be represented by the expression (3) $$Q' = AV$$

where $A$ = the area of the flowing fluid at said vertical cross section.

This area $A$, for a maximum depth $D$, may be expressed as follows:

$$A = \int_0^D x \, dy,$$

where $x$ is the width of the tank at any height $y$ from the bottom.

Substituting the value $A$ in the above expression (3), we have $$Q' = V \int_0^D x \, dy.$$

Since it is assumed that the flow is continuous between the selected vertical cross section of the tank or channel and the control section or sections, $Q = Q'$, and accordingly the above expression for flow at these points may be equated as follows:

$$V \int_0^D x \, dy = cbH^{\frac{3}{2}},$$

and substituting for $D$ its value as above expressed,—

(4) $$V \int_0^{H+h+p-\frac{V^2}{2g}} x \, dy = cbH^{\frac{3}{2}}$$

or (5) $$\int_0^{H+h+p-\frac{V^2}{2g}} x \, dy = \frac{cb}{V} H^{\frac{3}{2}}$$

which is a general expression for the shape of vertical cross section at any point in a tank or channel discharging through a control section or sections, in terms of the velocity of flow at the selected section. Since the values $p$, $h$, $b$, and $H$ are known or can be estimated in any given case, it is thus possible to solve the above general expression for the shape of the vertical cross section of the tank or channel in terms of $x$ or $y$,
under any desired assumption as to the value of $V$.

For example, it may be desired that $V$ vary in some known manner with the discharge $Q$. Since $Q$ is a function of $H$ (as above noted $$Q = cbH^{\frac{3}{2}})$$

$V$ may be expressed in terms of $H$, and its value introduced into the above general expression. The proper cross sectional shape of the tank or channel may then be determined by finding the values of $x$ and $y$ which will satisfy the equation.

For most practical cases, the velocity $V$ will be so small that the velocity head $$\frac{V^2}{2g}$$

will be inappreciable in amount as compared with the depth $D$, and thus this term may be neglected. Also, if the velocity be low, the friction loss will be negligible, and if the longitudinal slope of the bottom of the tank or channel be small or zero, a determination of the shape of the cross section at any selected point will suffice for the entire length of the tank.

For this special case, when $V$ is small, $p = 0$, and $h$ is so small that it may be neglected.

$D = H$ (very nearly) and thus the general expression for tank section reduces to the simple equation (6) $$\int_0^D x \, dy = \frac{cb}{V} D^{\frac{3}{2}}.$$

If, for example, it be desired that $V$ be constant for all rates of discharge and the width $b$ does not vary with the depth, the above expression, in terms of $x$ and $y$ and this constant velocity, reduces to (7) $$x = \frac{3}{2} \frac{cb}{V} y^{\frac{1}{2}}$$

which it will be noted is the equation of an ordinary parabola with axis $OY$, and where $x$ is the total length of a chord parallel to the $OX$ axis. Thus for constant velocity, the vertical cross section of the tank may be parabolic, or a close approximation thereto.

If, for example, $y = H$, and $x = W$ (the width at the top surface of the liquid) the expression for such top width becomes (8) $$W = \frac{3}{2} cbH^{\frac{1}{2}}$$

or if such top width be desired in terms of $Q$ and $V$, (since $$Q = cbH^{\frac{3}{2}}) WH = \frac{3}{2} \frac{Q}{V},$$

from which for a given value of $Q$ and $V$, the top width of the tank may be determined for any desired depth $H$.

If the control section be of such shape that the discharge $Q$ varies in accordance with formula (1b), above; then $$\int_0^D x \, dy = \frac{c(b_1 + zD)}{V} D^{\frac{3}{2}}; \text{ or}$$

$$x = \frac{3}{2} \frac{cb_1}{V} y^{\frac{1}{2}} + \frac{5}{2} \frac{cz}{V} y^{\frac{3}{2}}.$$

For the case where it is desired that with a constant value of $b$, $V$ vary inversely as the depth $D$, that is $$V = \frac{k}{D},$$

the above general expression reduces to $$\int_0^D x\,dy = \frac{cb}{k} D^{\frac{3}{2}},$$

which, being solved in terms of $x$ and $y$ becomes (9)  $$x = \frac{5}{2}\frac{cb}{k} y^{\frac{3}{2}}$$

the equation of a semi-cubic parabola with axis OY and where $x$ equals the total length of a chord parallel to OX. Since $c$ may be known, or approximately determined by experiment, $b$ may be found from the equation $$Q = cbH^{\frac{3}{2}}$$

for any selected values of H and Q, and $c$ and $b$ may then be substituted in the above expression in the determination of the tank shape.

In the latter case, if the control section be so shaped that $b = b_1 + sD$, then the expression $$\int_0^D x\,dy = \frac{cb}{k} D^{\frac{3}{2}}$$

becomes $$\int_0^D x\,dy = \frac{c(b_1 + sD)}{k} D^{\frac{3}{2}}, \text{ or}$$

$$x = \frac{5}{2}\frac{cb_1}{k} y^{\frac{3}{2}} + \frac{7}{2}\frac{cs}{k} y^{\frac{5}{2}}$$

However, it is to be noted that while the equations of formulæ (7) and (9) may represent parabolas when referred to rectangular coordinates,—any channel section involving the relationship of $x$ and $y$ expressed in these equations will fulfill all of the requirements, whether or not such shape is symmetrical with respect to any given datum line. It may be generally stated that where D is approximately equal to H and it is desired that V vary in relation to D such that $V = kD^n$, the cross-sectional shape of the tank or channel discharging through a control section of constant width $b$ may be found from the expression

(10)  $$x = \left(\frac{3}{2} - n\right)\frac{cb}{k} y^{\frac{1}{2}-n}$$

where $n$ is any desired exponent, positive or negative or zero, $x$ is the total width of the section at any height $y$, and $k$ is a constant.

If in the latter case, the control section be of such shape that the discharge $$Q = c(b_1 + sD)D^{\frac{3}{2}}$$

then $$\int_0^D x\,dy = \frac{c(b_1 + sD)}{k} D^{\frac{3}{2}-n},$$

or $$x = \left(\frac{3}{2} - n\right)\frac{cb_1}{k} y^{\frac{1}{2}-n} + \left(\frac{5}{2} - n\right)\frac{cs}{k} y^{\frac{3}{2}-n}$$

As specific numerical examples, reference may be had to Figs. 4 and 5.

In Fig. 4, the maximum depth D in tank T is 4.0 feet; the flow Q is 12 cubic feet per sec.; and the allowable velocity V=one foot per sec. Assuming that D=H and that $$c = 3.09, \quad Q = 3.09 b D^{\frac{3}{2}}.$$

Then, by substitution $$b = \frac{Q}{cD^{\frac{3}{2}}} = \frac{12}{3.09 \times 4^{\frac{3}{2}}} = 0.485 \text{ ft.}$$

As V is to be constant, the shape of the tank section may be found from the above formula $$x = \frac{3}{2}\frac{cb}{V} y^{\frac{1}{2}}.$$

Then by substitution in formula (7), $$x = \frac{3}{2}\frac{3.09 \times 0.485}{1} y^{\frac{1}{2}} = 2.25 y^{\frac{1}{2}},$$

$x$ being the width at any height $y$. Fig. 4 shows a parabolic section which conforms to the equation, and is illustrative of a tank section giving constant velocity.

In the arrangement shown in Fig. 4ª, the channel section Tª is also calculated by formula (7), but in this instance the tank widths at different depths are all measured from one side of a vertical line $u$, and thus while the same flow conditions are obtained as in a section like that of Fig. 4, the tank section is not symmetrical. Fig. 4ª is illustrative of the numberless unsymmetrical shapes of section which conform to the calculated formulæ.

In Fig. 5, one selected shape of any section of tank T' of symmetrical contour, is shown for conditions such that the velocity shall vary inversely as the depth, or $$V = \frac{k}{D}$$

(that is, that $n = -1$ in the equation $V = kD^n$).

Employing the same values for D, Q, and V, and the same control section or sections as in the foregoing example, and since $k = VD = 4$, by substitution in the above formula (9)

$$x = \frac{5}{2}\frac{3.09 \times 0.485}{4} y^{\frac{3}{2}} = 0.937 y^{\frac{3}{2}}$$

$x$ being the width at any height $y$.

The above general and specific examples sufficiently illustrate the invention to permit those skilled in the art to apply the principles involved to any particular cases which may arise in practice.

While the present invention is particularly useful as a means of automatically controlling the velocity of flow through a tank or channel, a further advantage results from the general shape of tank or channel necessary, as above noted, to obtain the desired flow conditions. When, for example, a tank be employed for sedimentation, it is usually necessary to employ some mechanical means such as scraper mechanism to remove the collected sediment, but with tanks of rectangular section, as is customary, the cleaning devices must needs be relatively wide to cover the floor of the chamber, and oftentimes the material must be moved laterally as well as longitudinally, to gather it together for delivery to an outlet. Such large scrapers require considerable power to operate them, and tend to stir up the tank contents. By the use of a tank or chamber of the type herein disclosed, this difficulty is largely avoided, since the sediment tends to collect in a relatively narrow strip central of the tank bottom, and thus a very simple form of scraper or screw, or belt conveyor serves to remove it, without undue expenditure of power, or agitation of the superimposed fluid such as to interfere with the sedimentation process.

In Figs. 6, 7 and 8, I have illustrated, by way of example, certain devices for removing sediment. Thus in Fig. 6, $e$ is a chain driven scraper or belt conveyor, adapted to move longitudinally of the tank T². In Fig. 7, $f$ is a screw conveyor disposed in a conduit below the bottom of a tank T³ of parabolic section; and in Fig. 8, I have shown the conveyor $g$ within the tank T⁴.

While there may be instances in which conditions are such that it is not practical to build the tank or channel of mathematically exact shape, I contemplate that in such cases, having first determined the proper shape as above described, the tank may be made of a shape as closely approximating the theoretical shape as conditions will permit, it being emphasized that the vertical section of the tank as determined by my present method need not be symmetrical,—the essential feature being that the width shall bear such a relationship to the depth at any point as is expressed in the formulæ hereinabove deduced. Thus in Figs. 9 and 10, I have illustrated the cross-sectional shape of tanks having plane downwardly convergent side walls V and horizontal bottom walls Z, but approximating the proper theoretical shapes (shown in broken lines) so nearly that for practical purposes the results attained will be acceptable.

In the appended claims, the characters employed in formulæ are to be construed as defined in the foregoing specification, where not specifically explained in any given claim.

I claim:

1. Flow control apparatus comprising in combination means defining a fluid container and means defining an efflux control section or sections arranged to control the flow through said container, the control section being of the kind through which fluid flows in substantial accordance with the formula $$Q = cbH^{3/2},$$

the approximate shape of the container at any selected vertical cross section being given by the formula $$\int_0^{H+h+p-\frac{V^2}{2g}} x\,dy = \frac{cb}{V} H^{3/2}$$

2. Flow control apparatus comprising in combination means defining a fluid container, and means defining a control section or sections operative to control the velocity of flow through the container, the slope of the bottom of the container between any selected vertical cross section and the control section being substantially zero, and the dimensions of the container being such that the mean velocity at said selected section is so low that the velocity head $$\frac{V^2}{2g}$$

and the lost head $h$ may be neglected, the shape of the container at such selected cross section being expressed by the formula $$\int_0^D x\,dy = \frac{cb}{V} D^{3/2}$$

where D is the depth of the container at said selected cross section.

3. Flow control apparatus comprising in combination means defining a fluid container and means defining a control section or sections operative to control the velocity of flow through the container, the vertical cross-sectional shape of the container at any selected point being expressed by the formula $$\int_0^D x\,dy = \frac{cb}{V} D^{3/2}$$

when D is the depth of the container at said selected point, the dimensions of the container being such that at any selected vertical cross section the mean velocity of flow will always be low enough so that the velocity head $$\frac{V^2}{2g}$$

and the lost head $h$ may be neglected, the control section or sections each being of the kind through which fluid flows in substantial accordance with the formula $$Q = cbH^{3/2}.$$

4. Flow control apparatus comprising in combination means defining a fluid container, and means defining a control section or sections operative to control the velocity of flow through the container, the vertical cross-sectional shape of the container at any selected point in its length being expressed by the formula $$x = \frac{3}{2}\frac{cb_1}{V}y^{1/2} + \frac{5}{2}\frac{cz}{V}y^{3/2}$$

and the control section or sections each being of the kind through which fluid flows in substantial accordance with the formula $$Q = c(b_1 + zH)H^{3/2}$$

whereby the velocity at the selected point in the container will be substantially constant for all values of the rate Q of discharge.

5. Flow control apparatus comprising in combination means defining a fluid container, and means defining a control section or sections operative to control the velocity of flow through the container, the container being of a vertical cross-sectional shape at any selected point in its length substantially as expressed by the formula $$x = \frac{3}{2}\frac{cb}{V}y^{1/2}$$

and the control section or sections each being of the kind through which fluid flows in substantial accordance with the formula $$Q = cbH^{3/2}$$

whereby the velocity V at said selected cross section of the container will be substantially constant for all values of the rate Q of discharge.

6. Flow control apparatus comprising in combination means defining a fluid container, and means defining a control section or control sections operative to maintain a flow through said container at a velocity V so low that $$\frac{V^2}{2g}$$

is negligible, the control section or sections being of the kind through which fluid flows substantially in accordance with the formula $$Q = cbH^{3/2}$$

the vertical cross-sectional shape of said container at any point in its length approximating a parabola of the general form $$x = \frac{3}{2}\frac{cb}{V}y^{1/2}$$

where $x$ is the width of the channel at any height $y$.

7. Flow control apparatus comprising in combination means defining a fluid container, and means defining a control section or sections operative to determine the velocity of flow through said container, said control section or sections being of the kind through which fluid flows substantially in accordance with the formula $$Q = c(b_1 + sD)\frac{1}{k}D^{\frac{3}{2}}$$

and the vertical cross-sectional shape of the container at any selected point in its length being expressed by the formula $$x = \frac{5}{2}\frac{cb_1}{k}y^{\frac{1}{2}} + \frac{7}{2}\frac{cs}{k}y^{\frac{3}{2}}$$

whereby the velocity V at said point in the container will vary inversely with the depth D of the container at said point.

8. Flow control apparatus comprising in combination means defining a fluid container, and means defining a control section or control sections operative to determine the velocity of flow through said container, said control sections being of the kind through which fluid flows substantially in accordance with the formula $$Q = cbH^{\frac{3}{2}}$$

and the vertical cross-sectional shape of the container at any selected point in its length being expressed by the formula $$x = \frac{5}{2}\frac{cb}{k}y^{\frac{1}{2}}$$

whereby the velocity V at said point in the container will vary inversely with the depth D of the container at said point.

9. Flow control apparatus comprising in combination means defining a fluid container, and means defining a control section or control sections operative to maintain a flow through said container at a velocity V so low that $$\frac{V^2}{2g}$$

is negligible, said control sections being of the kind through which fluid flows substantially in accordance with the formula $$Q = cbH^{\frac{3}{2}},$$

and the vertical cross-sectional shape of said container at any point in its length approximating a parabola of the general form $$x = \frac{5}{2}\frac{cb}{k}y^{\frac{1}{2}}$$

where $x$ is the width of the container at any height $y$.

10. Flow control apparatus comprising in combination means defining a fluid container in which the velocity of fluid flow is substantially expressed by the formula $V = kD^n$, and means defining a control section or sections operative to determine the velocity of flow through said container, said control section or sections being of the kind through which fluid flows substantially in accordance with the formula $$Q = \frac{c(b_1 + sD)}{k}D^{\frac{3}{2}-n}$$

and the vertical cross section of said container at any point in its length approximating a shape as expressed by the equation $$x = \left(\frac{3}{2} - n\right)\frac{cb_1}{k}y^{\frac{1}{2}-n} + \left(\frac{5}{2} - n\right)\frac{cs}{k}y^{\frac{3}{2}-n}$$

where $n$ is any desired exponent, positive, negative, or zero, and $x$ is the width of the container at any height $y$ from its bottom.

11. Flow control apparatus comprising in combination means defining a fluid container, and means defining a control section or control sections operative to determine the velocity of flow through said container, said control sections being of the kind through which fluid flows substantially in accordance with the formula $$Q = cbH^{\frac{3}{2}}$$

and the vertical cross section of said container at any point in its length approximating a shape as expressed by the equation $$x = \left(\frac{3}{2} - n\right)\frac{cb}{k}y^{\frac{1}{2}-n}$$

where $n$ is any desired exponent, positive, negative or zero, and $x$ is the width of the container at any height $y$ from its bottom.

12. Flow control apparatus comprising in combination means defining a fluid container, and means defining a control section or control sections operative to determine the velocity of flow through said container, said control sections being of the kind through which fluid flows substantially in accordance with the formula $$Q = cbH^{\frac{3}{2}}$$

and the vertical cross-sectional shape of said container at any point in its length approximating a parabola of the general form $$x = \left(\frac{3}{2} - n\right)\frac{cb}{k}y^{\frac{1}{2}-n}$$

where $n$ is any desired exponent, said container being of substantially symmetrical shape at any vertical cross section.

13. Flow control apparatus comprising in combination means defining a fluid container and means defining a control section of the kind through which fluid flows substantially in accordance with the formula $$Q = cbH^{\frac{3}{2}}$$

said control section being arranged to determine the velocity of flow through said container, the vertical cross-sectional shape of said container at any selected point in its length bearing a definite relation to the constants of said control section thereby automatically to regulate the velocity within the container to desired value for any rate of discharge.

14. Flow control apparatus comprising in combination means defining a fluid container, and means defining a control section or control sections operative to determine the velocity of flow through said container, the shape of said control sections being such that fluid flows therethrough substantially in accordance with the general formula $$Q = cbH^{\frac{3}{2}}$$

and the container having a cross-sectional shape substantially in accordance with the expression $$x = \left(\frac{3}{2} - n\right)\frac{cb_1}{k}y^{\frac{1}{2}-n} + \left(\frac{5}{2} - n\right)\frac{cs}{k}y^{\frac{3}{2}-n}$$

where $n$ s any desired exponent, said container having downwardly convergent side walls, and a bottom.

15. Flow control apparatus comprising in combination means defining a fluid container, and means defining a control section or control sections operative to determine the velocity of flow through said container, said control sections being so shaped that fluid flows therethrough substantially in accordance with the formula $$Q = cbH^{\frac{3}{2}}$$

said container having side walls and a bottom, the shape of said container at any vertical cross section approximating the shape expressed by the equation $$x = \frac{3}{2}\frac{cb}{V}y^{\frac{1}{2}}$$

16. Flow control apparatus comprising in combination means defining a fluid container, and means defining a control section or control sections designed and arranged to determine the velocity of flow through said container, said control sections being of such shape that fluid flows therethrough substantially in accordance with the formula $$Q = cbH^{\frac{3}{2}}$$

said container having substantially plane side walls and being of a cross-sectional contour closely approximating the shape expressed by the formula $$x = \frac{3}{2}\frac{cb}{V}y^{\frac{1}{2}}$$

THOMAS R. CAMP.